Jan. 23, 1962 S. W. FAIRWEATHER 3,017,840
RAILWAY CARS FOR TRANSPORTATION OF VEHICLES
Filed Oct. 17, 1957 9 Sheets-Sheet 1

Inventor
S. W. FAIRWEATHER
By Fetherstonhaugh & Co.
Attorneys

Jan. 23, 1962   S. W. FAIRWEATHER   3,017,840
RAILWAY CARS FOR TRANSPORTATION OF VEHICLES
Filed Oct. 17, 1957   9 Sheets-Sheet 5

Inventor
S. W. FAIRWEATHER
By 
Attorneys

Jan. 23, 1962 S. W. FAIRWEATHER 3,017,840
RAILWAY CARS FOR TRANSPORTATION OF VEHICLES
Filed Oct. 17, 1957 9 Sheets-Sheet 8

Inventor
S. W. FAIRWEATHER
By Fetherstonhaugh & Co.
Attorneys

3,017,840
RAILWAY CARS FOR TRANSPORTATION OF VEHICLES
Starr W. Fairweather, Montreal, Quebec, Canada, assignor to Canadian National Railway Company, Montreal, Quebec, Canada
Filed Oct. 17, 1957, Ser. No. 690,650
6 Claims. (Cl. 105—368)

This invention relates to the transportation of vehicles in railway cars.

One object of this invention is to enable vehicles to be loaded into a series of railway cars while the cars are coupled togethed by an endwise loading procedure in which the vehicles are passed through the cars in the longitudinal direction thereof until each car has been loaded with the desired number of vehicles.

Another object of this invention is to provide railway box cars with end openings through which vehicles may be passed for loading and unloading of the vehicles through adjacent car ends when the cars are coupled together and to provide folding door structures therefor capable of being swung to open and closed positions without necessitating uncoupling of the cars.

Another object is to provide a novel door structure of the character described which comprises divided doors, each consisting of a plurality of panels hinged in series to one another and to one car side to swing about vertical axes so that the panels are folded together as each door is swung outwardly to provide the necessary clearance between the coupled car ends for opening said doors.

A further object is to provide said door structure with novel locking means whereby the panels of each door are secured in the closed position and the divided doors are also locked in lapping relation when the panels of each door have been secured in their closed position.

A still further object is to provide a railway box car for the transportation of vehicles having end openings for the passage of vehicles therethrough with rigid internal cross-frame members extending upwardly from either side of the car base and across the car so as to reinforce the side wall and roof structures to prevent side sway of said side wall structures.

A still further object of this invention is to provide a railway car having end openings for the loading or unloading vehicles therethrough with a novel deck structure including a platform upon which vehicles may be mounted and which is slidable in endwise directions of the car relative thereto, and means connected between the car and the platform for resiliently resisting said sliding movement of the platform.

Still another object is to provide a novel, tie-down means for rigidly securing the wheels of a vehicle to a platform of the character described to prevent relative movement therebetween.

Yet another object of this invention is to provide a railway box car for the transportation of vehicles with end openings through which vehicles may be passed and including a lower decking for the mounting of vehicles thereon and an upper decking supported by the side wall structure of the car intermediate the lower decking and a roof structure extending between the upper edges of the side wall structures.

A still further object is to provide double deck railway box cars for the transportation of vehicles with end openings through which vehicles may be passed from one car to another for end loading of said cars while they are coupled together, and detachable vehicle supporting members adapted to be arranged to bridge the space between the corresponding decks of adjacent cars so that vehicles may be passed successively through the coupled cars until the required number of vehicles is loaded into each car.

The above and other objects as well as the characteristic features of this invention will become more apparent from the following detailed description taken in connection with the accompanying drawings in which.

Referring more particularly to FIGS. 1, 2, 6 and 7 of the drawings, 5 generally designates an automobile transporter car including an underframe 6 carried by body bolsters 7 for mounting on trucks generally designated 8, a pair of cross-frames 9, one rigidly mounted on each body bolster 7, opposing side wall structures 10, end door structures 11, a roof structure 12 and lower and upper decks 14 and 15 respectively.

The underframe 6 generally comprises a central sill 16 extending through the body bolsters 7 from end-to-end of the car, side sills 17 extending from end-to-end, cross-ties 18, cross-bearers 19 and floor stringers 20 carried by said cross-ties for the support of the lower deck 14 which is secured thereto.

Figures 8, 9, 10:
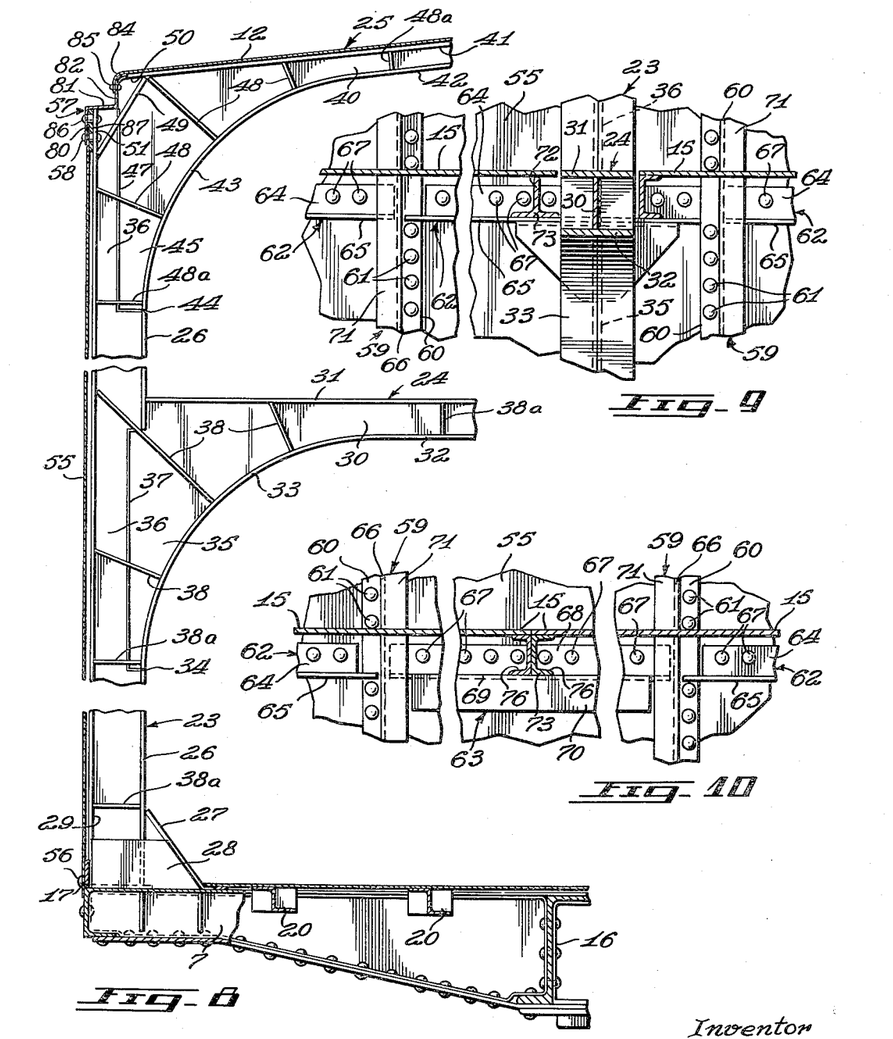
FIG. 8 is an enlarged fragmentary view illustrating the structure of the rigid cross-frames shown in FIGS. 1, 2, 6 and 7.
FIG. 9 is a fragmentary view of a portion of the inner wall of the car where one of the rigid cross-frame members is located.
FIG. 10 is a fragmentary view of the inner surface of one wall of the car illustrating the support of the upper deck.

Each cross-frame 9 includes a pair of vertical H-beam posts 23, one mounted on each end of a body bolster 7, an intermediate cross-beam 24 and a top cross-beam 25 (see FIGS. 8 and 9). Each post 23 is arranged with one flange 26 facing inwardly and with the lower end welded or otherwise secured to the bolster. An inclined stiffener or prop plate 27 has its upper end welded to the inner flanges 26 of post 23 a relatively short distance from the bottom and its lower end welded to the top surface of the bolster 7 inwardly of the post. Vertically disposed side supporting plates 28 are arranged on either side of the post 23 and are welded to the top surface of the bolster 7, the adjacent edges of the inner and outer flanges 26 and 29 of post 23 and along their inner inclined ends to the adjacent edges of the inclined prop 27. The prop 27 and supporting plates 28 form a rigid support for the post 23.

The intermediate cross-beam 24 which is also H-formation extends between the posts 23 with its web 30 upright and its top flanges 31 extending horizontally and secured at its ends to the surface of the inner flanges 26 of each post 23 at right angles thereto. The bottom flanges 32 of cross-beam 24 are parallel with the top flanges 31 throughout a substantial portion and has arched flange extensions 33 at each end which curve downwardly to meet the inner flanges 26 at 34. The inner flanges 26 are interrupted substantially throughout the depth of the flange extensions 33 so that a web extension 35, projecting from said flange extensions 33, may be joined to the adjacent exposed edge of the web 36 of post 23, as indicated at 37. Web extension 35 is also integrally formed with the web 30 of cross-beam 23. Stiffeners 38 extend radially between the flange extensions 33 of the cross-beam top flange 31 and post outer flange 29 on either side of their connecting webs. Additionally, similar stiffeners 38a may also be arranged between the top and bottom flanges 31 and 32 and inner and outer flanges 26 and 29 at spaced intervals.

The top cross-beam 25 which is H-formation has its web 40 upright and inclines upwardly from the opposing posts toward the car centerline with its top flanges 41 disposed along inclined planes from either end which intersect at the centerline of the car. The bottom flanges 42 parallel the top flanges for a substantial length on opposite sides of the said centerline and have arched flange extensions 43 at each end which curve downwardly to meet the inner flanges 26 of post 23 at 44. The inner flanges 26 are interrupted throughout the depth of flange extensions 43 so that a web extension 45, projecting from said flange extensions 43 may be joined to the adjacent exposed edge of the web 36 of post 23, as indicated at 47. Web 45 is also integrally formed with web 40 of cross-beam 25. Stiffeners 48 and 48a extend between the flanges of the top cross-beam 25 and of the post 23 in a similar manner to stiffeners 38 and 38a. The top flanges 41 of cross-beam 25 and the outer flanges 29 of post 23 are connected by flanges 49 on either side of webs 36—45 which are welded at their opposite ends to flanges 41 and 29 inwardly of their ends so as to provide free marginal end extensions 50 and 51 of flanges 41 and 29.

The side wall structures 10 comprise strips of metal sheeting 55 which extend from top to bottom and have their side edges in lapping relation with adjacent side edges of successive strips. The sheeting is riveted along the bottom edge to the side sills 17, as indicated at 56, and to top rails 57, as indicated at 58 along the top edge. A Z-section vertical support 59 extends from the sill 17 to the top rail 57 behind each lapping side of the sheeting and the lapping sheeting is riveted to the outer flange 60 of said vertical support as indicated at 61.

Horizontal braces 62 and 63 are alternately arranged between the vertical supports 59 intermediate the length thereof and on either side of the two rigid cross-frames 9. Each brace 62 is preferably L-section with one flange 64 directed upwardly and butted against the inner surface of the sheeting 55 so that the end edges of said flange 64 are flush with the outer flange 60 of the vertical support 59. The remaining flange 65 of brace 62 laps the outer flange 60 of support 59 and is secured to the web 66 of said support. Rivets 67 secure the sheeting 55 to the abutting flange 64 of brace 62. Braces 63 are Z-section with one flange 68 directed upwardly and butted against the inner surface of sheeting 55. The end edges of the butted flanges 68 and the web 69 of brace 63 extend to and are secured to the opposing surfaces of the support webs 66. The remaining inner flange 70 of brace 63 depends between the opposing edges of the inner flange 71 of said supports 59. The horizontal alternating braces 62 and 63 extend to opposite sides of the cross-frames 9 but are free of attachment thereto.

The braces 63 support the upper deck cross-members 72 and 73. Cross-members 72 are T-section and have their flanges or heads 74 flatly engaging the upper surface of the brace web 69 with the web of cross-members 72 disposed vertically. At predetermined intervals cross-members 73 are substituted for cross-members 72. These cross-members 73 comprise a pair of channels disposed with their webs welded in face to face relation so that adjacent lower flanges 76 on one side of the webs flatly engage the upper surface of the web 69 of brace 63. Floor stringers, certain of which are L-section, as indicated at 77, and other are Z-section, as indicated at 78, extend between the cross-members 72 and 73. In each case the lower flange of stringers 77 and 78 abuts the heads or lower flanges of the cross-members and the webs extend across the said heads or lower flanges of the cross-members and are welded thereto and to the webs of said cross-members. The floor stringers 77 and 78 and the cross-members 72 and 73 extend on opposite sides of the cross-frames 9 but are free of attachment thereto. An upper decking 15 is laid and secured on the cross members and floor stringers 72, 73 and 77, 78. This decking 15 is preferably in the form of sheet metal strips which are laid in end-to-end relation so that their abutting end edges are superimposed on the upper flanges 79 of cross-members 73. The end edges of certain of the decking 15 terminate adjacent to the intermediate cross-beam 24 of cross-frames 9. The horizontal plane of said decking 15 is level with the upper horizontal plane of said cross-beams 24.

The top side rails 57 are Z-section and have one flange 80, to which the upper edges of the side wall sheeting 55 are riveted, extending downwardly, the web 81 extending inwardly from flange 80 and the remaining flange 82 extending upwardly in offset relation to the first flange 80.

Standard diagonal corrugated roofing structure 12 is laid in panels across the upper end of the car. The panels have their turned side marginal portions 84 riveted to the upwardly extending flange 82 as indicated at 85. The top side rails 57 have their lower flanges 80 riveted to the upper ends of posts 23, as indicated at 86. Fillers 87 are interposed between the outer flange 29 of post 23 and said lower flange 80 of top rail 57 to space the side wall sheeting 55 outwardly from said post. The rigid cross-frames 9 serve to brace the side wall structures to prevent side sway. Running boards 88, which extend longitudinally of the central portion of the roof structure 12, are secured to cross-supports generally indicated at 89 carried by said roof structure.

The lower and upper deckings 14 and 15 each support a plurality of lengths of sliding platforms 90 (see FIGS. 1 to 5). Each platform 90 comprises a pair of laterally spaced longitudinally extending track plates 91 which are secured in spaced relation by diagonal and transverse L-sections braces 92 and 93 respectively, secured to inward plate extensions 94. The platform 90 is arranged for sliding movement relative to the decking 14 or 15 in the longitudinal direction of the car between spaced guide members 95 which are welded or otherwise secured to the upper surface of the decking. Guide members 95 have a plate 96 secured to the upper surface thereof, said plate having an inwardly directed marginal extension which freely overlies the adjacent marginal portion of the platform plate 91 to prevent an upward displacement of the platform.

Figures 1, 2:
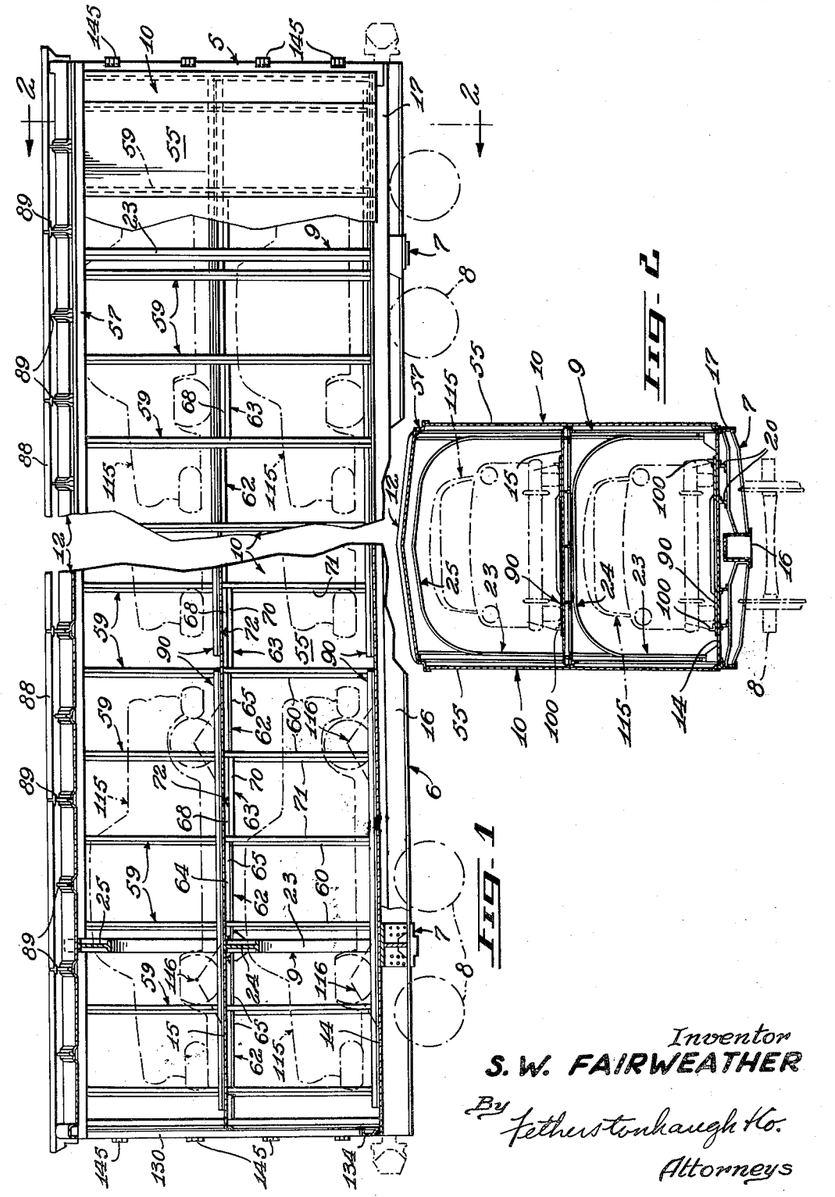
FIG. 1 is a side view, partly in vertical section and partly broken away of a car embodying my invention.
FIG. 2 is a sectional view taken along the line 2—2 of FIG. 1.
Figures 3, 4:
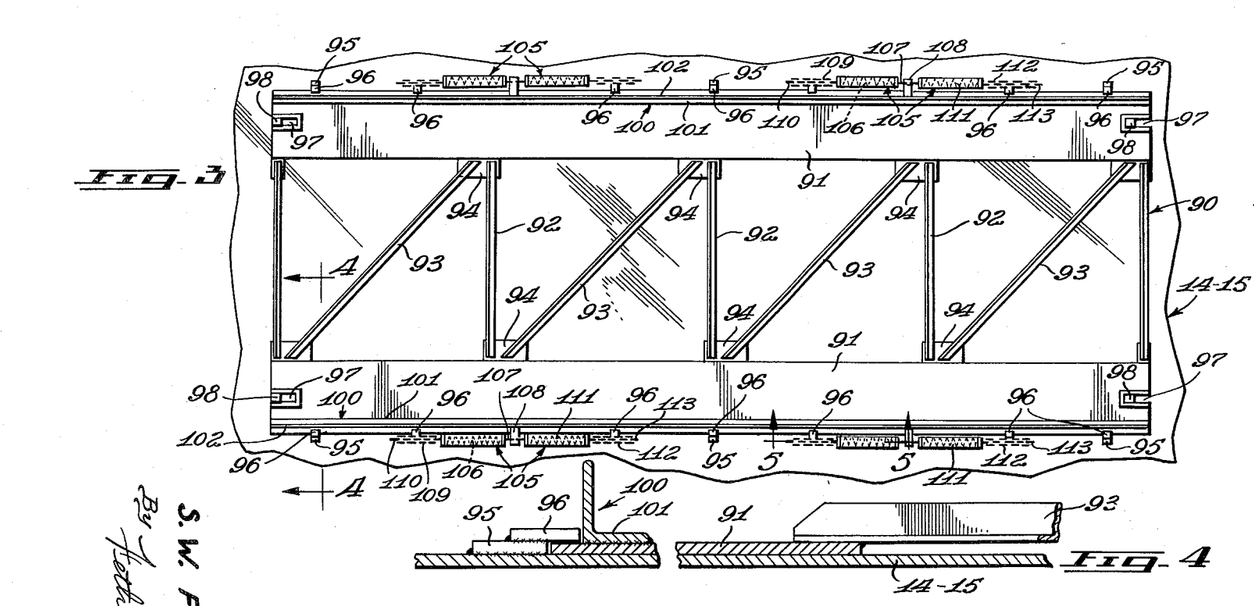
FIG. 3 is a plan view of one of the sliding platforms shown in FIGS. 1 and 2.
FIG. 4 is an enlarged sectional view taken along the line 4—4 of FIG. 3.
Figure 5:
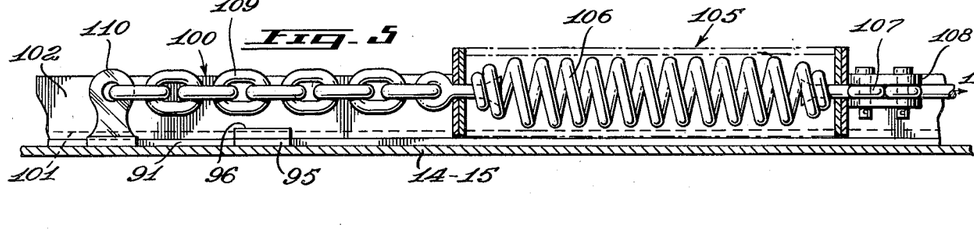
FIG. 5 is an enlarged sectional view taken along the line 5—5 of FIG. 3.
Figure 6:
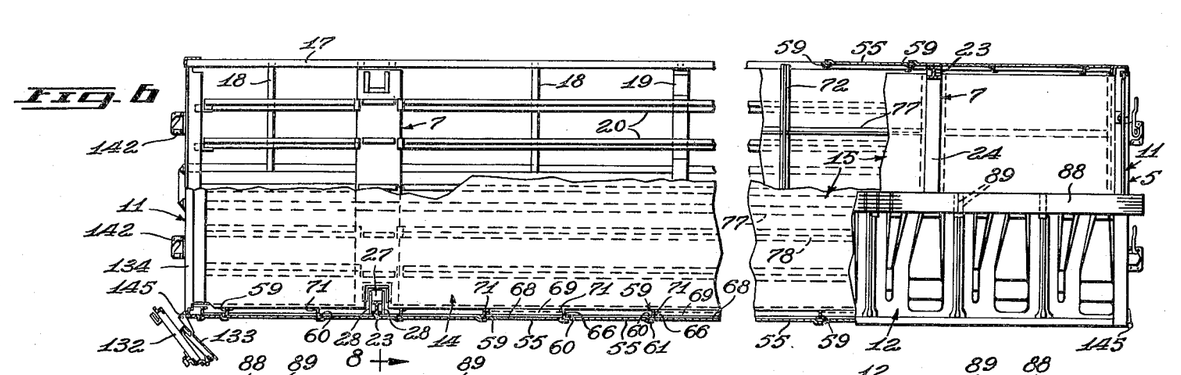
FIG. 6 is a top plan view of the car shown in FIG. 1, portions of it being broken away to reveal the structure of the lower and upper decks, the sliding platforms being removed for the sake of clarity.
Figure 7:
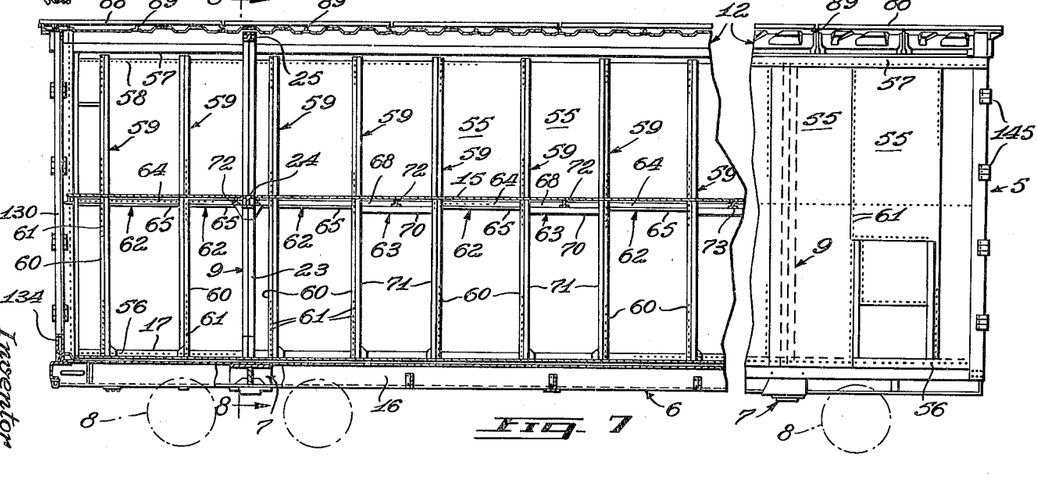
FIG. 7 is a side elevational view illustrating the parts of the car shown in FIG. 6.

The platforms 90 are mounted on the decking between the guide members 95 in endwise relation with a predetermined amount of clearance between adjacent ends of the platforms. The platform plates 91 are slotted or recessed at each end, as indicated at 97. Stop members 98 which are welded or otherwise secured to the decking 14 or 15 projects into the recesses 97 to limit the amount of longitudinal sliding movement of each platform 90. A side rail member 100, which is preferably L-section, is mounted along the length of each platform plate 91 with one flange 101 secured to plate 91 so that the other flange 102 projects upright a predetermined distance inwardly of the outer side margin of plate 91.

One or more web-like plates may be substituted for the braces 92 and 93 to maintain the track plates 91 in spaced relation. These web-like plates have the advantage that there are no sharp edges to strike should the car wheels run off the track plates 91.

Each platform 90 is connected to at least one and preferably shock absorber assemblies 105 on either side thereof. Each assembly comprises a tensioning member 106, preferably in the form of a coil spring having one end linked as indicated at 107 to lugs 108 projecting from the flange 102 of side rail member 100, and having the other end connected to a chain 109 which is fastened at its free end to an anchor ring 110 secured to the decking 14 or 15, so as to extend parallel to the platform 90 at one side of lug 108. A second tensioning member 111 is secured at one end to lug 108 on the other side thereof and at the other end to a chain 112 which is fastened at its free end to an anchor ring 113 secured to said decking. The springs 106 and 111 are under constant tension to resiliently resist longitudinal movement of the platform 90 and a load thereon relative to the freight car.

The load above referred to will normally consist of an automobile or like vehicle, generally designated 115, which, after having been driven or otherwise propelled onto the track plates 91 of the platform 90, are secured to said platform by front and rear tie-down devices generally indicated at 116 (see FIGS. 33 to 37). The tie-down device 116 includes a car wheel hub attachment comprising a cylindrical body portion 117 externally threaded at its outer end 118 and provided at its inner end with radially extending lugs 119 with interconnecting webs 120. The lugs 119 are suitably spaced to correspond with the car wheel retaining bolts. Certain of the lugs may have an enlarged opening 121 so that the nut and bolt aligned therewith will project through the opening. Others will have a restricted opening 122 through which the bolt only will project so that the corresponding nut, when threaded onto the bolt, will engage the lug to retain said hub attachment on the wheel.

Figures 33, 34, 35, 36, 37, 38:
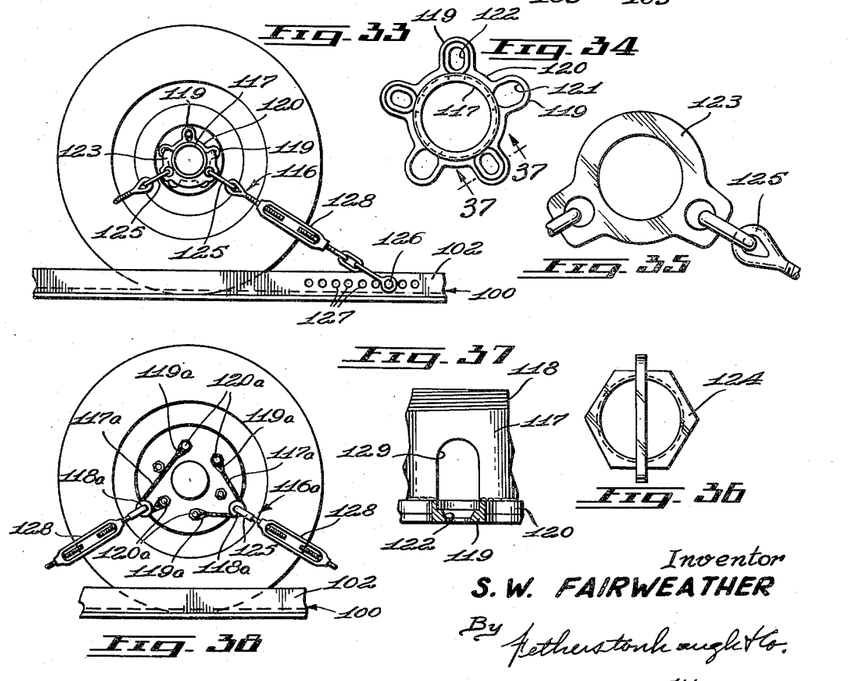
FIG. 33 is a fragmentary view showing one form of a tie-down member for anchoring the wheels of a car to a sliding platform shown in FIGS. 1 to 4 inclusive.
FIGS. 34 to 36 are detail views of elements embodied in FIG. 33.
FIG. 37 is a sectional view taken along the line 37—37 of FIG. 34.
FIG. 38 is an elevational view of a modified form of a wheel tie-down member.

When the hub attachments are secured to the wheels of a vehicle a ring 123 is slidably fitted over the cylindrical body portion 117 and is retained thereon by a nut 124 which is threaded onto the outer end 118. Ring 123 has a tie chain 125 linked thereto which is adapted to be extended angularly down to the upright flange 102 of the platform side rail 100 where it is secured thereto at its free end by a pin 126 which extends through one of a series of spaced openings 127 in said flange 102. A turnbuckle 128 intermediate the length of tie chain 125 serves to tension the tie chain. Alternatively, a second tie chain may extend angularly down from the ring 123 in the opposite direction to be similarly anchored at its free end to the side rail flange 102 so that each wheel is separately secured to the platform so as to prevent relative movement therebetween.

It will be noted that the openings 121 and 122 are radially elongated to accommodate different models in which the wheel retaining bolts are spaced at different radial distances from the centre of the wheel axis. Slots 129 are also provided in the cylindrical body portion 117 of the hub attachment to facilitate the placement of the wheel bolt nuts. This is particularly desirable in such models in which the radial distance between the wheel bolt and its axis is relatively short.

An alternative tie-down 116a is illustrated in FIG. 38. This consists of a sling 117a about a pulley 118a on the end of chain 125 remote from its connection to the rail 100. The free ends of sling 117a are provided with rings 119a which are fitted over the wheel retaining bolts and held thereon by the retaining nuts 120a. The slings 117a are tensioned by turnbuckle 128.

Each end of the car is fitted with a novel end door construction 11 detailed in FIGS. 11 to 22 and comprising four vertically extending door panels 130, 131, 132 and 133 swingable about vertical axes and a bottom door panel 134 swingable about a horizontal axis. The bottom door panel 134 extends across the width of the car and is swingable about a horizontal axis on spaced hinges 135 carried by the car end sill 136 to outward and downward or upward and inward positions. In the latter position the hinges 135 dispose the bottom door panel 134 between the ends of the car side wall structure 10. The ends of the bottom door panel are provided with elongated slots 137 reinforced at one side as indicated at 138 to receive a locking tongue 139 of a lock 140 mounted in the car side wall structure 10 and operable by a handle 140a. The upper end of panel 134 has an inwardly offset extension lip 141, the purpose of which will become apparent from the continuance of this description. A pair of supporting brackets or shelf-like members 142 extend from the outer surface of the end door panel 134 for the mounting thereon of door fastening elements hereinafter described.

Figure 11:
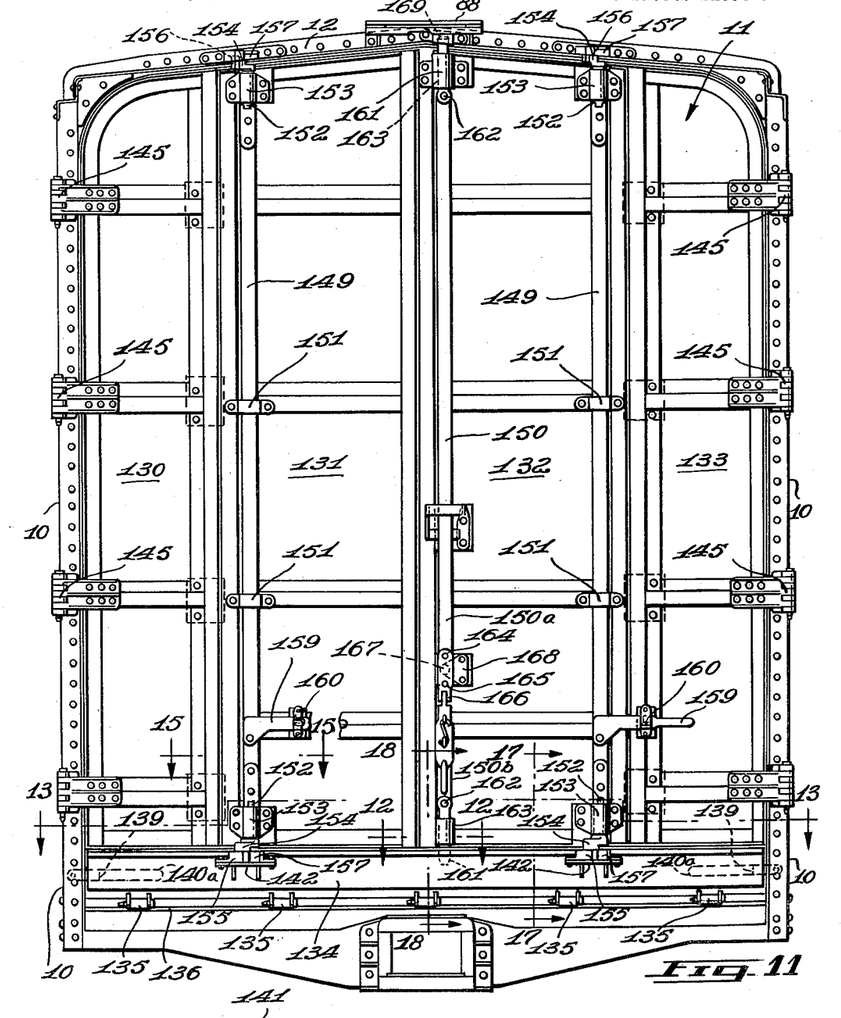
FIG. 11 is an end view of the car.
Figure 12:
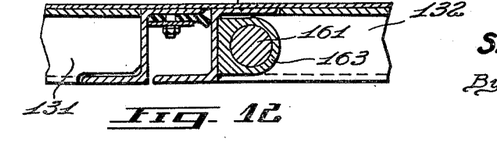
FIG. 12 is an enlarged sectional view taken along the line 12—12 of FIG. 11.
Figure 13:
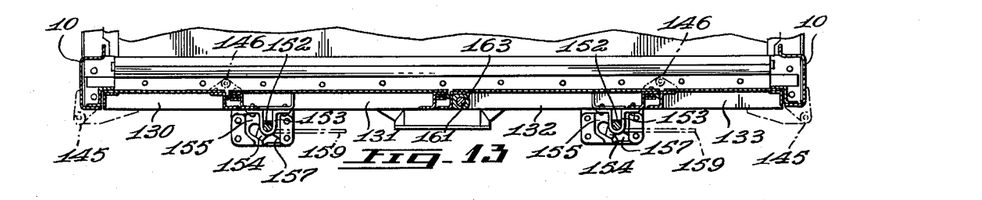
FIG. 13 is a sectional view taken along the line 13—13 of FIG. 11.
Figures 14, 15:
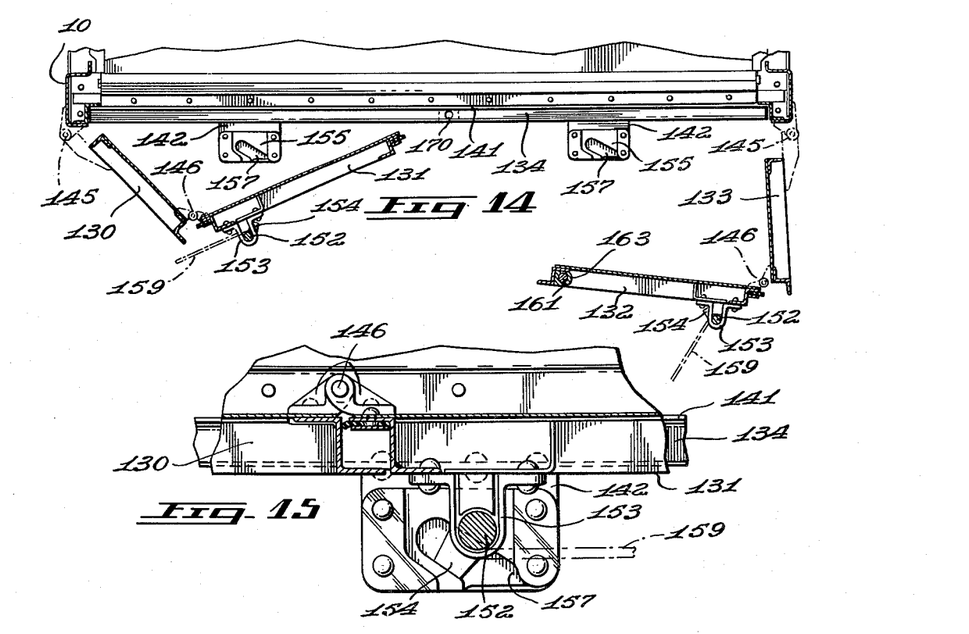
FIG. 14 is a view similar to FIG. 13 but showing the end doors swung outwardly from the end of the car.
FIG. 15 is an enlarged detail view taken along the line 15—15 of FIG. 11.
Figure 16:
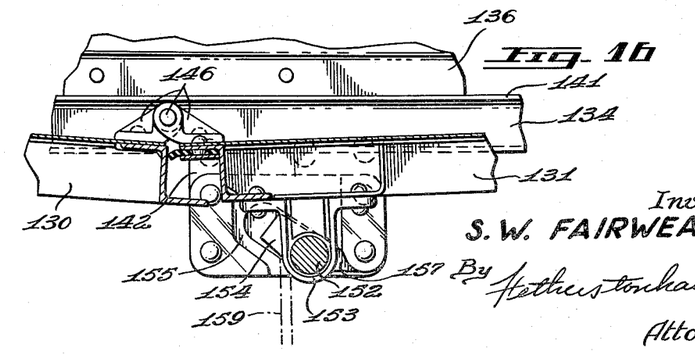
FIG. 16 is a view similar to FIG. 15 but showing portions in a different position than that shown in FIG. 15.

The vertical door panels 130 and 133 extend from the roof structure 12 to adjacent the lower horizontal door panel 134 so that the lower end of panels 130 and 133 overlap the offset extension lip 141 when closed. Panels 130 and 133 are hinged along their outer side edges by hinge members 145 which are carried by the outer surface of the side wall structure 10 so as to permit outward swinging movement of each panel 130 and 133 respectively to a position paralleling the side wall structure 10, and inward swinging movement of said panels to recessed positions lying within the vertical plane of ends of the car side wall and roof structures 10 and 12. Door panels 131 and 132 also extend from the roof structure 12 to adjacent the lower horizontal door panel 134 to overlap the offset extension lip 141 of panel 134 in a similar manner to that of panels 130 and 133. Each door panel 131 and 132 has its outer vertical side edge hinged to the adjacent inner side edge of door panels 130 and 133 respectively by hinges 146 which are secured to the inner surfaces of the adjacent door panels 130, 131 and 132, 133. With this arrangement the inner door panels 131 and 132 may be swung inwardly towards the inner surface of adjacent door panels 130 and 133 as the latter are being swung outwardly and then to a position paralleling and opposing the outer surface of the car side wall structure 10. This reduces the end clearance of the car required to open these end door structures 11, the purpose of which will become apparent in the ensuing description. The width of the outer door panels 130 and 133 may also be substantially less than the width of the inner door panels 131 and 132 to further reduce the end clearance required for opening these end doors.

Figures 17, 18, 19, 20, 21, 22:
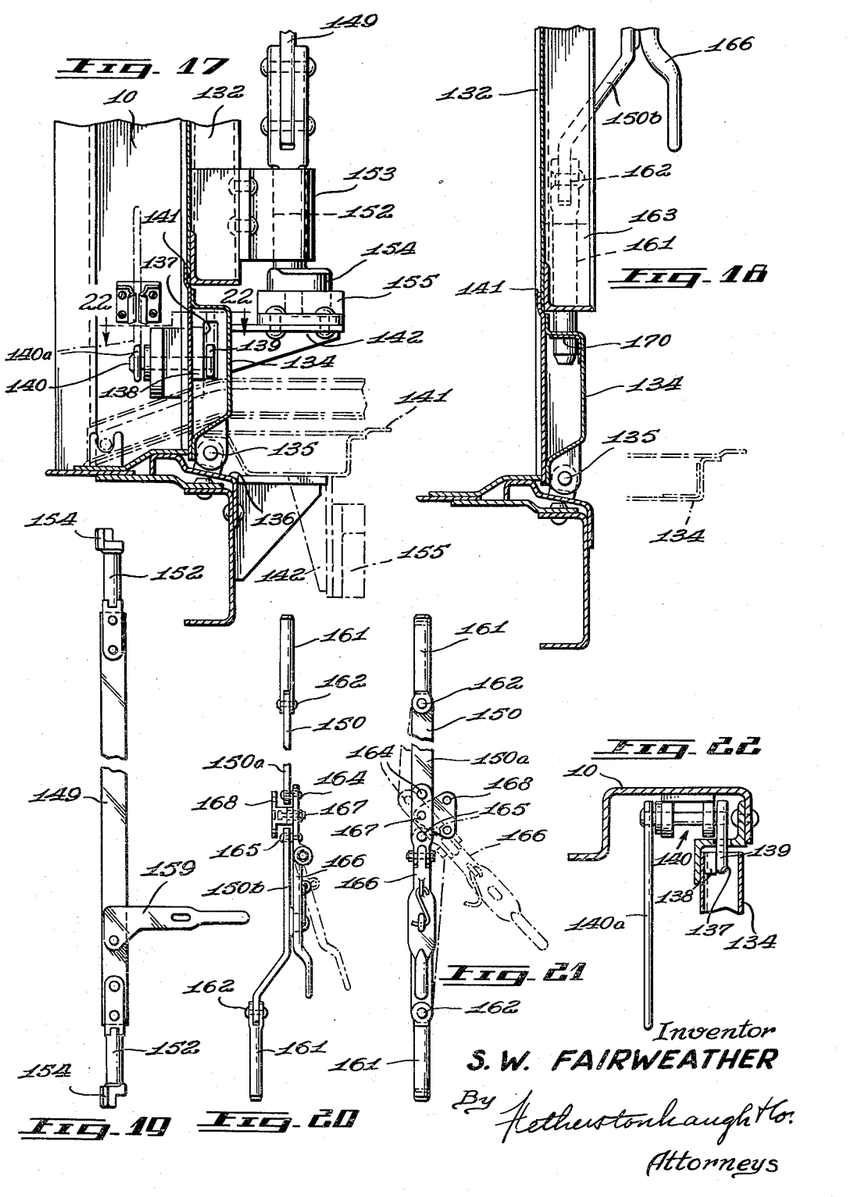
FIG. 17 is an enlarged view taken along the line 17—17 of FIG. 11.
FIG. 18 is an enlarged detail view taken along the line 18—18 of FIG. 11.
FIG. 19 is a view illustrating one of the locking bars shown in FIGS. 11 to 17.
FIGS. 20 and 21 are detail views of another of the locking bars shown in FIGS. 11, 12, 13, 14 and 18.
FIG. 22 is a sectional view taken along the line 22—22 of FIG. 17.

The end door panels 130 to 133 are secured in their closed position by locking bars generally designated 149. The panels 131 and 132 each carry a locking bar 149 which extends vertically through straps 151 adjacent the hinge connection 146 to panels 130 and 133 respectively. The locking bar 149 is provided at its upper and lower ends with bolts 152 mounted for rotation in bearing plates 153 secured to the panels 131 and 132 adjacent their upper and lower ends. Bolts 152 have goose-neck projections 154 at their extremities which project beyond the upper and lower edges of the panels 131 and 132. A slotted plate 155 is mounted on the supporting brackets 142 of the horizontally pivoted end door panel 134 and a second plate 156 similarly slotted on the under side thereof is mounted on the end of roof structure 12. Plates 155 and 156 have a diagonal slot 157 from the outer edges thereof.

When the door panels are open the bolts 152 are rotated by means of a handle 159 carried by bar 149 so that the goose-neck projections 154 extend inwardly. Upon closing the doors projections 154 will penetrate the diagonal slot 157. The projection is then rotated in the slot by reverse movement of handle 159. This action due to the offset position of the projections 154 relative to the bolts 152 turns the projections outwardly and thereby exerts a closing pressure against the door panels at their hinge connection 146. The projections 154 can be rotated in the slots 157 until the handles 159 are brought to bear against a stop member 160 which limits rotation of the projections 154 to a point beyond which the projections would be free to move outwardly along the length of the diagonal slots 157.

Due to the lapping arrangement of their meeting edges panels 130 and 131 will be closed before panels 132 and 133. Panel 132 carries a locking bar 150 adjacent its lapping edge with the inner panel 131. This bar 150 has upper and lower bolts 161 pivoted thereto at 162. Bolts 161 are vertically slidable in bearings 163 secured to the panel 132 adjacent the top and bottom extremities thereof. Bar 150 is divided into upper and lower sections 150a and 150b which are pivotally connected at 164 and 165 respectively to a lever 166. Lever 166 is pivotally mounted at 167 to a plate 168 secured to the surface of door panel 132. The pivotal mounting 167 is intermediate pivotal connections 164 and 165 of locking bar sections 150a and 150b so that rotation of lever 166 about pivot 167 will cause selective extension and retraction of the bolts 161 with respect to upper and lower bolt engaging means 169 and 170 carried by the roof structure 12 and the bottom door panel 134 respectively.

One of the principal objects of providing folding end doors of the character described is that it facilitates intercommunication between a series of similar automobile transporter cars. It will be appreciated that box cars, when coupled together, have a limited space therebetween which hitherto made it impractical to provide end doors for loading and unloading through the ends of the cars where the door panel widths approximated half the width of the car. To open such doors would first of all necessitate uncoupling each car then recoupling after the doors were opened for loading and unloading through one end of a series of cars. The process of uncoupling and recoupling would also have to be resorted to in order to close the doors after each loading and unloading. The time, labour and equipment involved made this system undesirable.

In the transportation of automobile by rail, the system of endwise loading was given careful consideration particularly in the matter of establishing intercommunication between the ends of a series of cars without uncoupling. As a result of this consideration the end door structure as embodied in this invention was conceived.

In order to span the distance between the lower decks 14 and upper decks 15 respectively of the adjacent ends of cars, running boards 172 and 173 are provided as particularly illustrated in FIGS. 23 to 32. The running board 172 which is used between the lower decks 14 comprises a metal sheeting which is curved towards its opposite ends to provide inclined ramps 174 which lead up to the central bridging section 175. The sheeting is secured to the upper surface of lower inturned flanges of side walls 176. The upper margins of side walls 176 are bent outwardly and then downwardly to reinforce said side walls. Side walls 176 serve to strengthen the platform as well as to provide outside guides for the automobile wheels. Trunnions 177 are secured to the side walls 176 adjacent one end and are adapted to be fitted in open-top bearings 178 mounted on the car deck 14 adjacent the end of at least one sliding platform track plate 91 so that the running board will span the car end sill and the end door panel 134 when the latter has been lowered. The other end of the running board freely overlies the decking 14 of the adjacent car substantially in alignment with the corresponding track plate 91. The free overlapping portion of the running board 172 is designed to take care of the maximum and minimum span between end sills as a result of extension or contraction of the couplings. The running boards 172 may be arranged so that the trunnions of each are mounted in bearings adjacent each track plate 91 of one car so that their free ends both overlap the end of the adjacent car. Alternatively, one running board may have its trunnions mounted in bearings adjacent one track plate in one car and the other running board may be similarly mounted adjacent the other track plate of the other car. With this latter arrangement it is only necessary to provide one running board 172 at each end of a car. Furthermore, there is no problem of checking to ensure that one end of a car having the trunnion bearings is coupled to the adjacent end of another car not having said trunnion bearings.

The same or similar type of running boards 172 may be arranged between the upper deck 15 of two adjacent cars. However, since the need for ramping to clear the car end sills and the drop door panel 134 does not arise, it is preferable to provide running boards 173. The running boards 173 include laterally spaced side frame members 180 which are of a substantial depth from one end for a greater portion of their length, the bottom edge tapering at 181 to form a relatively shallow side frame section 182 extending throughout the remainder of the running board. As viewed in cross-section the side frames have inturned lower marginal extensions 183 and outwardly and then downwardly upper marginal extensions 184. Extensions 183 and 184 serve to reinforce the side frames 180. Channels 185 extend between side frames 180 for that portion which has the greater depth. The channels 185 are welded to the side frames with their webs disposed vertically and their flanges extending unidirectionally. The top flange 186 is of substantially greater width than the bottom flange 187 and has its marginal portion curved downwardly so that its edge will avoid contact with an automobile tire surface. The shallower section 182 is provided with a plate 188 which is supported on the inturned marginal extensions 183. Plate 188 has its outer edge deflected downwardly to avoid contact with said tire surface. The channels 185 and plate 188 provide supporting means over which the wheels of an automobile may travel from one car to another. The channels 185 are suitably spaced to prevent accumulation of ice and to afford good traction for the wheel surfaces. The end of the running board remote from the shallow section is provided with side plates 189 shaped on their under surface to form a hook or claw 190 which is engageable over horizontal pins 191 between brackets 192 which project from the end cross-member 73a of the upper deck supporting frame. The shallow section 182 rests freely on the upper deck 15 of the adjacent car. The running boards 173 may either be attached to the end of the same car so that their free ends rest on the upper deck 15 of the adjacent car, or one board may be reversely arranged with respect to the other.

With the end doors opened as previously described and the upper and lower running boards emplaced as described between adjacent car ends, a series of cars may be filled or unloaded from one end only by driving the automobiles through each car in the series along both the upper and lower decks until the cars are loaded or unloaded as the case may be. Each car is designed to accommodate eight standard length automobiles (four up and four down) or six automobiles which substantially exceed the normal length. While the platforms 90 are designed to wholly support a standard length automobile, where it is necessary to accommodate ones of greater than standard length, portions of two adjacent platforms 90 will readily accommodate them. For this reason the flange 102 of side rails 100 are provided with a series of spaced openings 127 to accommodate any adjustment of the chains 125 for the anchoring of an automobile to the side rail 100 of the platform 100 upon which a wheel is supported.

When loading is completed the running boards are removed and suitably placed inside the car. The doors 11 are then closed without the necessity of uncoupling the cars and the cars are ready for travel. After unloading the automobiles the running boards may be similarly removed to permit the closing of the end doors so that the cars will be in readiness for return to their starting point or any location where automobiles are in readiness for transportation.

Figure 23:
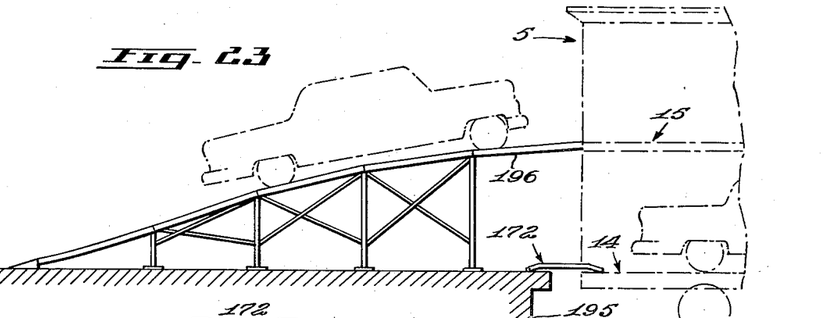
FIG. 23 is a schematic view showing the manner in which automobiles are loaded into one end of a series of cars from a platform.
Figures 24, 26:
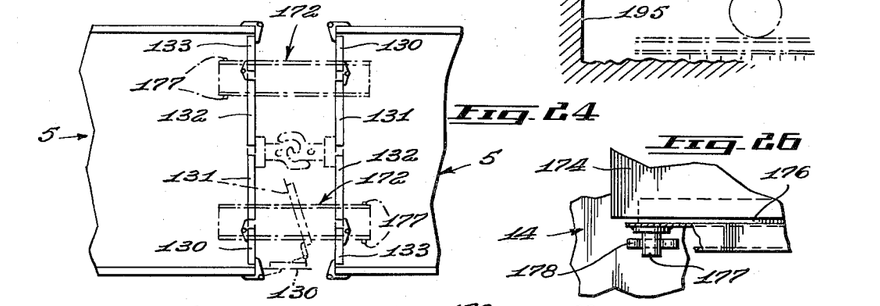
FIG. 24 is a schematic view in plan showing the bridging of the coupled ends of two cars for loading from one to the other.
FIG. 26 is a detail view in plan of a fragment of the bridging member shown in FIG. 25.
Figure 25:
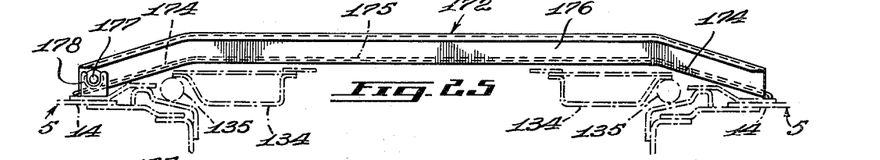
FIG. 25 is an elevational view (schematic) showing the manner in which the lower decks of two cars are bridged.
Figure 27:
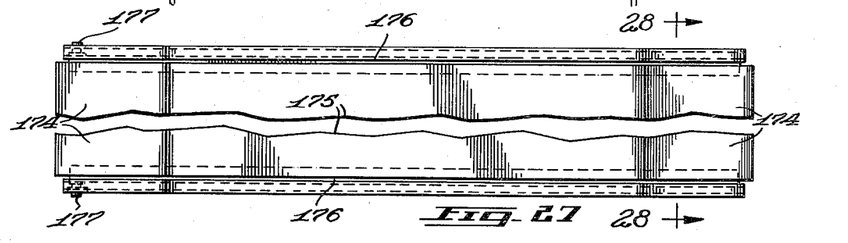
FIG. 27 is a plan view of the bridging member shown in FIG. 25.
Figure 28:
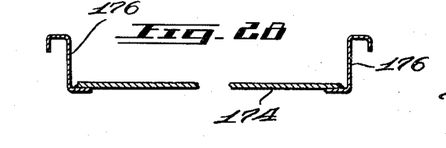
FIG. 28 is a sectional view taken along the line 28—28 of FIG. 27.
Figures 29, 30, 31, 32:
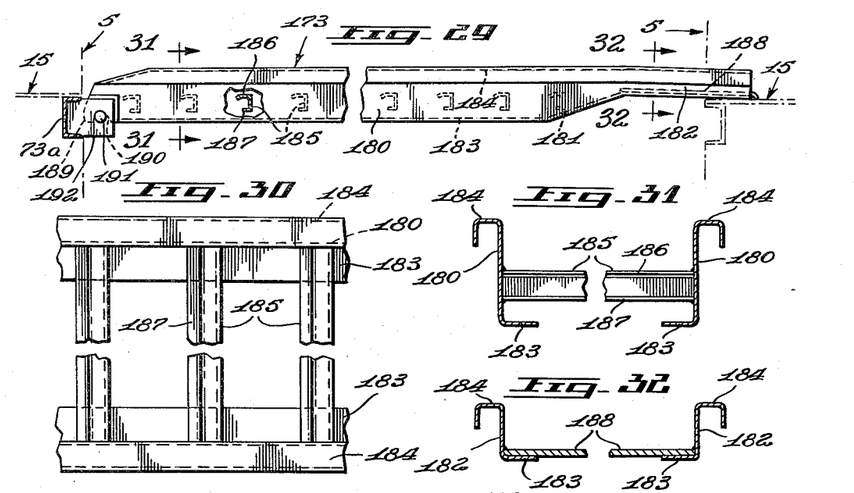
FIG. 29 is an elevational view (schematic) of a bridging member between the upper decks of two adjacent cars.
FIG. 30 is a fragmentary view in plan of the bridging member shown in FIG. 29.
FIG. 31 is a sectional view taken along the line 31—31 of FIG. 29.
FIG. 32 is a sectional view taken along the line 32—32 of FIG. 29.

As shown, particularly in FIG. 23, a series of cars 5 may be loaded from a platform 195. In this event running boards 172 may be suitably employed for loading into the lower deck 14. After the lower decks of the cars have been loaded a ramp 196, which may be unitary or sectional, is mounted on the platform 195 and the upper end is secured to the end of the deck 15 in the manner of running board 173, that is, by providing claw plates 189 on the ends of the ramp 196 which engage with pins 191 between brackets 192 which project from the end cross-member 73 of the upper deck 15.

What I claim is:

1. A railway box car for the transportation of vehicles, said box car including an under-frame, side walls extending upwardly from said under-frame and a roof structure carried by said side walls, means for securing adjacent side margins of said roof structure to upper margins of said side walls, said box car being provided at each end with an opening through which the vehicles may be passed into and out of the car, a pair of rigid cross frames, one of the said pair being located inwardly a substantial distance from one end of the car and the other of the said pair being located inwardly a substantial distance from the remaining end of the car, each cross frame being rigidly supported by said under-frame and in spaced relation to said side walls and roof structure, said means for securing the side margins of said roof structure to upper margins of said side walls being further secured to said cross frames and door structures for opening and closing said end openings when said car is coupled to an adjacent car, each of said door structures including a first door extending across a substantial width of said opening and having its outer side margin hingedly connected to one side of said box car to swing outwardly about a vertical axis, and a second door extending across the remaining width of said opening and having its outer side margin hingedly connected to the remaining side of said box car to swing outwardly about a vertical axis, said first door comprising a pair of vertically extending panel sections arranged in side-by-side relation with the adjacent side of each panel section hingedly connected to swing about a separate vertical axis for folding said panel sections inwardly as the first door is swung outwardly about its hinged connection to the first mentioned side of the car, and said second door comprising a pair of vertically extending panel sections arranged in side-by-side relation with the adjacent side of each of said last mentioned panel sections hingedly connected to swing about a separate vertical axis for folding said panel sections inwardly as the second door is swung outwardly about its hinged connection to said remaining side of the car.

2. A railway box car as set forth in claim 1, including a deck mounted on said under-frame, said side walls each including a side wall frame structure extending upwardly from said under-frame, said roof structure being secured to said side wall frame structures, each of said cross-frames including a pair of laterally disposed vertical posts spaced inwardly from said side wall frames and rigidly secured at their lower ends to said under-frame and an arched cross-beam extending between the upper ends of said vertical posts and rigidly secured thereto in spaced relation to said roof structure.

3. A railway box car as set forth in claim 2, including a second cross-beam extending between and supported by said posts of each cross-frame intermediate the under-frame and said first cross-beam, and an upper deck structure extending between and supported by said side wall frame structures on each side of but free of connection with each of said second cross-beams.

4. A railway box car as set forth in claim 3 in which said side wall frame structure includes a plurality of laterally spaced vertical supports extending between a side sill carried by said under-frame and a top rail, and horizontal braces extending between adjacent vertical supports intermediate their length, said braces having a flat horizontal bearing surface, and said upper deck structure including a plurality of laterally spaced cross-members carried at their ends by certain opposing braces on opposite side frames of the car, floor stringers extending between adjacent cross-members and a floor sheeting overlying and supported by said cross-members and stringers.

5. A railway box car as set forth in claim 1, said car including a pair of laterally spaced bolsters for mounting on trucks, an under-frame carried by said bolsters, each of said cross-frames including vertically extending side members rigidly secured at their lower ends to the bolster and a top member extending between and connecting the upper portions of said side members, said side walls including opposing side wall frame structures carried upwardly from said under-frame, said roof structure being supported by said side wall frame structures, the side members of each cross-frame being disposed in opposing spaced relation to the inner surfaces of said side wall structures and the top member of each cross-frame being opposed to but spaced from the lower surface of the roof structure.

6. A railway box car as set forth in claim 5, in which said securing means of the side walls and roof structure are secured to the upper portions of the cross-frame side members and to adjacent upper edge portions of the side wall frame structure.

References Cited in the file of this patent

UNITED STATES PATENTS

| | | |
|---|---|---|
| 964,020 | Heintzelman | July 12, 1910 |
| 1,380,229 | Manheim | May 31, 1921 |
| 1,433,884 | Frost | Oct. 31, 1922 |
| 1,676,426 | Christianson et al. | July 10, 1928 |
| 1,811,312 | Fildes | June 23, 1931 |
| 1,856,106 | McMullen | May 3, 1932 |
| 1,865,246 | Goodwin | June 28, 1932 |
| 2,040,486 | Kellett | May 12, 1936 |
| 2,047,955 | Fitch | July 21, 1936 |
| 2,088,655 | King | Aug. 3, 1937 |
| 2,205,273 | Radey | June 18, 1940 |
| 2,335,216 | Suckfield | Nov. 23, 1943 |
| 2,640,443 | Schieler et al. | June 2, 1953 |
| 2,643,010 | Hott et al. | June 23, 1953 |
| 2,690,141 | King | Sept. 28, 1954 |

FOREIGN PATENTS

| | | |
|---|---|---|
| 1,100,634 | France | Apr. 6, 1955 |